Patented May 18, 1954

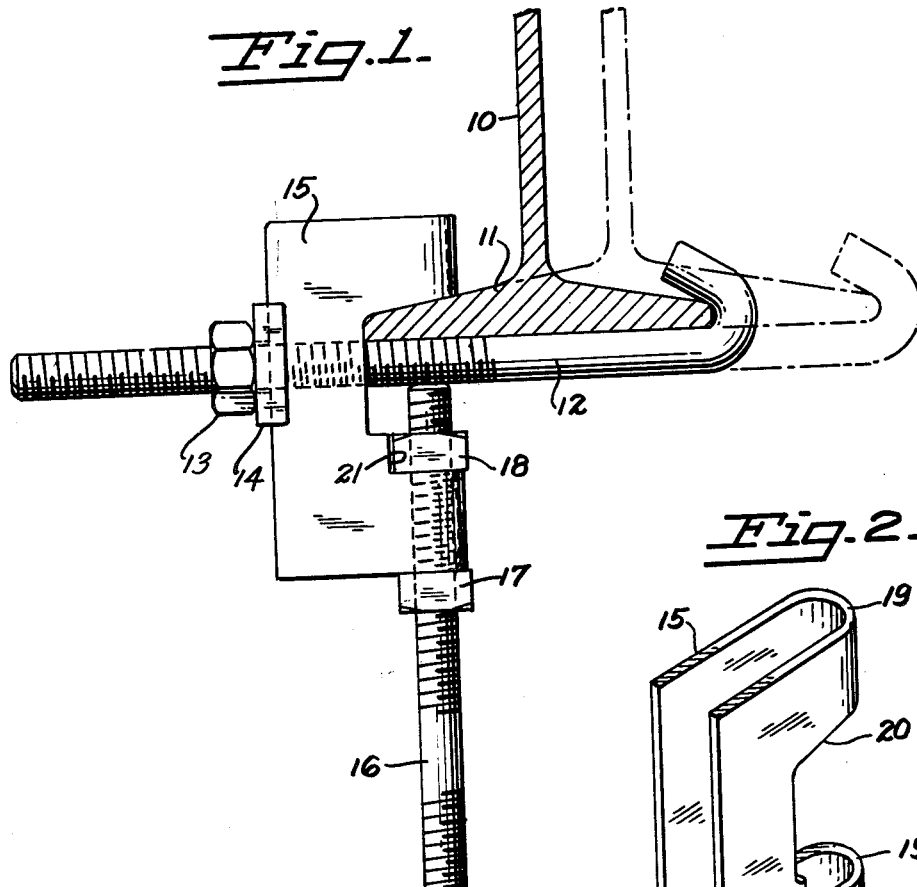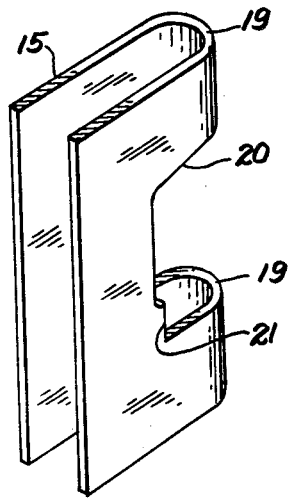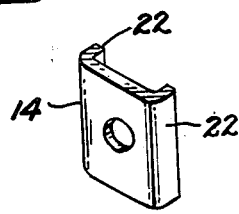

2,678,786

UNITED STATES PATENT OFFICE 2,678,786

SUPPORT FOR PIPE HANGERS AND THE LIKE

Orlan C. Kindorf, San Francisco, Calif.

Application October 9, 1950, Serial No. 189,151

2 Claims. (Cl. 248—72)

The present invention relates to supports for pipe hangers and the like and more particularly to supports for suspending hangers for pipe, conduit or other fixtures for overhead beams.

It is the object of this invention to provide a support of simple and inexpensive structure capable of being easily and rigidly secured to a beam part and readily adaptable to beams of various sizes. Further and more specific objects and advantages of the invention are made apparent in the following specification wherein the invention is described in detail by reference to the accompanying drawings.

In the drawings:

Fig. 1 is a side elevation of a support for pipe hangers or the like embodying the present invention and showing the same in place on a beam;

Fig. 2 is a perspective view of a part of the support shown in Fig. 1; and

Fig. 3 is a perspective view of another part of the support.

The support is illustrated in Fig. 1 of the drawings as secured in place on a typical beam which has a web 10 and a flange 11. The support comprises a hook bolt 12 having a nut 13 and washer 14 thereon and a clamp part 15 through which the hook bolt passes. A combined clamping bolt and hanger rod 16 also forms a part of the support and has nuts 17 and 18 threaded on one end thereof.

The clamp part 15 as best illustrated in Fig. 2 is made of a rectangular piece of heavy sheet metal centrally perforated and then bent to a U-shape on a radius forming a curve 19 of sufficient size to embrace the bolt or rod 16. The perforate or cut-away part of the clamp 15 is shaped to provide an inclined edge 20 conforming, as shown in Fig. 1, to the incline on the inner side of the beam flange 11. The opposite edge of the opening is provided with a step or shoulder 21 spaced in close proximity to the nut 18 in order to prevent rotation of the nut when it is assembled in the position shown in Fig. 1.

The washer 14 is illustrated in Fig. 3 as having flanges 22 thereon to embrace the separate edges of the clamp part 15 which the washer overlies. This prevents spreading of the clamp and generally strengthens the structure though the flanges may be omitted if desired.

The manner in which the support is assembled on a beam may be understood by reference to Fig. 1. When the hook bolt 12 has been passed through the clamp part 15, its hooked end is engaged over one edge of the beam flange and the clamp part drawn securely into place over the opposite edge by tightening the nut 13 against the washer 14. The rod 16 may have been previously loosely assembled through the lower part of the clamp 15 with the nuts 17 and 18 in place thereon and is advanced upwardly through the nut 18 by turning of the rod itself until its upper end engages the hook bolt 12 to hold it in position against the bottom of the beam flange. The portion of the hook bolt 12 against which the rod engages may be flattened if desired to form a seat for the end of the rod 16 though this is not necessary. The nut 17 is then advanced upwardly on the rod 16 into engagement with the lower edge of the clamp part 15 thus locking the rod against rotation and providing a downwardly extending threaded end upon which any clamping or supporting devices for pipe or fixtures may be carried. The length of the rod 16 may, of course, be varied to suit the nature of the device to be supported.

The adjustability of the support to beams of different sizes is illustrated in Fig. 1 wherein a larger beam is shown in broken lines as embraced by the hooked end of the bolt 12 which may be extended any desired distance by adjustment of the nut 13 thereon. The device as herein illustrated is extremely simple and inexpensive to manufacture because it is made of standard threaded rods or bolts and a simple rectangular piece of metal shaped by inexpensive punch press operations. To save material, the washer 14 may be cut from the center of this piece of metal prior to making the larger perforation therein.

The threaded end of the hook bolt 12 also provides a convenient supporting member in addition to the downwardly extending rod 16. If the beam flange is disposed in a vertical rather than a horizontal plane as shown, the end of the hook bolt would depend vertically and could become the principal support for hangers or fixtures.

I claim:

1. A device for supporting pipe hangers and the like from a beam flange which comprises a hook-bolt adapted to engage with one edge of a flange, a hook part slidable axially on the bolt and adapted to engage with the opposite edge of the flange, nut means on the hook-bolt to urge the hook part toward the hook end of the bolt so as to grip the edges of the flange, said hook part comprising a U-shaped metal plate perforated at its bend to receive the hook bolt and permit movement of the bolt in a direction transverse to its axis so as to provide an adjustable space between the bolt and an edge of said perforation for engagement with the flange edge, a threaded rod received within the bend of the U-shaped hooked part at right angles to the hook bolt, and a nut on said rod disposed within said perforation and bridging the opposite sides of the U-shaped metal plate to permit tightening of said rod against the hook bolt.

2. A device for supporting pipe hangers and the like from a beam flange which comprises a hook-bolt adapted to engage with one edge of a flange, a hook part slidable axially on the bolt and engageable with the opposite edge of the flange, a nut threaded on the bolt to urge said hook part toward the hook end of the bolt so as to grip the edges of the flange, said hook part comprising a U-shaped metal plate perforated at its bend to receive the hook bolt and permit movement of the bolt in a direction transverse to its axis so as to provide an adjustable space between the bolt and an edge of said perforation for engagement with the flange edge, the said edge of said perforation which is engageable with the flange edge being shaped to conform to the contour of the engaged portion of the beam flange, a threaded rod received within the bend of the U-shaped hooked part at right angles to the hook bolt, and a nut on said rod disposed within said perforation and bridging the opposite sides of the U-shaped metal plate to permit tightening of said rod against the hook bolt.

References Cited in the file of this patent

UNITED STATES PATENTS

| Number | Name | Date |
| --- | --- | --- |
| 763,987 | Kriebel | July 5, 1904 |
| 989,808 | Rockwood | Apr. 18, 1911 |
| 1,652,695 | Barber | Dec. 13, 1927 |
| 1,673,813 | Edelmann | June 19, 1928 |
| 1,737,214 | Brown | Nov. 26, 1929 |
| 2,470,991 | Kindorf et al. | May 24, 1949 |